United States Patent
Fritsche et al.

(10) Patent No.: US 10,072,158 B2
(45) Date of Patent: Sep. 11, 2018

(54) METHOD FOR PRODUCING AN AQUEOUS COMPOSITION COMPRISING A CONDENSATE BASED ON SILICON COMPOUNDS FOR PRODUCING ANTIREFLECTIVE COATINGS

(71) Applicant: Ferro GmbH, Frankfurt am Main (DE)

(72) Inventors: Klaus-Dieter Fritsche, Colditz (DE); Gerhard Tünker, Heusenstamm (DE)

(73) Assignee: Ferro GmbH, Frankfurt am Main (DE)

( * ) Notice: Subject to any disclaimer, the term of this patent is extended or adjusted under 35 U.S.C. 154(b) by 121 days.

(21) Appl. No.: 14/898,879

(22) PCT Filed: May 30, 2014

(86) PCT No.: PCT/EP2014/001464
§ 371 (c)(1),
(2) Date: Dec. 16, 2015

(87) PCT Pub. No.: WO2014/202181
PCT Pub. Date: Dec. 24, 2014

(65) Prior Publication Data
US 2017/0190918 A1  Jul. 6, 2017

(30) Foreign Application Priority Data
Jun. 18, 2013  (DE) .................... 10 2013 010 105

(51) Int. Cl.
| | | |
|---|---|---|
| C09D 5/00 | (2006.01) | |
| C09D 183/02 | (2006.01) | |
| C08L 1/28 | (2006.01) | |
| C08L 83/02 | (2006.01) | |
| C09D 7/65 | (2018.01) | |
| C08G 77/02 | (2006.01) | |

(52) U.S. Cl.
CPC .............. *C09D 5/006* (2013.01); *C08L 1/284* (2013.01); *C08L 83/02* (2013.01); *C09D 7/65* (2018.01); *C09D 183/02* (2013.01); *C08G 77/02* (2013.01)

(58) Field of Classification Search
CPC ............................ C09D 5/006; C09D 183/06
See application file for complete search history.

(56) References Cited

U.S. PATENT DOCUMENTS

| | | | |
|---|---|---|---|
| 4,148,689 A | 4/1979 | Hino et al. | |
| 4,535,026 A | 8/1985 | Yoldas et al. | |
| 5,585,186 A * | 12/1996 | Scholz | C03C 17/007 106/287.1 |
| 6,054,601 A | 4/2000 | Standke et al. | |
| 6,177,131 B1 | 1/2001 | Glaubitt et al. | |
| 6,918,957 B2 | 7/2005 | Kursawe et al. | |
| 7,128,944 B2 | 10/2006 | Becker et al. | |
| 7,575,809 B2 | 8/2009 | Glaubitt et al. | |
| 8,394,187 B2 | 3/2013 | Fritsche et al. | |
| 2006/0154044 A1 | 7/2006 | Yamada et al. | |
| 2011/0052815 A1* | 3/2011 | Fritsche | C03C 17/25 427/282 |
| 2014/0017399 A1 | 1/2014 | Arndt et al. | |

FOREIGN PATENT DOCUMENTS

| | | |
|---|---|---|
| DE | 4020316 A1 | 1/1992 |
| DE | 19918811 A1 | 11/2000 |

OTHER PUBLICATIONS

International Search Report for corresponding PCT/EP2014/001464 dated Aug. 28, 2014, two pages.
Espacenet bibliographic data for DE4020316 published Jan. 9, 1992, two pages.
Espacene bibliographic data for DE19918811 published Nov. 2, 2000, two pages.

* cited by examiner

*Primary Examiner* — Nicholas E Hill
(74) *Attorney, Agent, or Firm* — Rankin, Hill & Clark LLP

(57) ABSTRACT

A method for producing an aqueous composition comprising a condensate based on silicon compounds, involving the steps of i) introducing at least one polymeric rheology control agent into water; ii) adding at least one acidic catalyst; iii) adding at least one silicon compound of general formula (I) RnSiX4-n in which the radicals X are the same or different and stand for hydrolysable groups or hydroxyl groups, the radicals R are the same or different and stand for non-hydrolysable groups, and n is 0, 1, 2, or 3; and iv) performing a hydrolysis reaction of at least part of the silicon compounds of general formula (I) added in step iii). The present invention further relates to a composition that can be obtained by means of the method according to the invention.

12 Claims, No Drawings

METHOD FOR PRODUCING AN AQUEOUS COMPOSITION COMPRISING A CONDENSATE BASED ON SILICON COMPOUNDS FOR PRODUCING ANTIREFLECTIVE COATINGS

The present invention relates to methods for producing an aqueous composition comprising a condensate based on silicon compounds and to a composition obtainable by the present method. The composition can be used particularly for producing antireflective coatings.

When light passes through the boundary surface of two media having different refractive indices, part of the radiation is reflected. A perpendicular incidence of light on a glass sheet having a refractive index of n=1.5 will result in a total reflected portion of approximately 8%. If the light strikes the boundary surface at an angle, generally a much larger portion is reflected. For many applications, a high degree of reflection is undesirable, as this results in a decrease in transmission.

Attempts have therefore been made to minimize this reflection. For example, surfaces have been provided with a highly porous coating in an effort to achieve this goal. Coatings of this type are disclosed, for example, in DE 196 42 419 A1, DE 199 18 811 A1, DE 10 2004 027842 A1, DE 10 2006 001078 A1, WO 03/027034 A2, DE 100 51 724 A1, DE 100 51 725 A1 and WO 2008/145253 A1.

The document DE 196 42 419 A1 describes the use of specific polymers for the production of compositions with which antireflective coatings can be obtained, however these coatings contain large quantities of organic solvents.

The document DE 199 18 811 A1 likewise discloses compositions that contain specific polymers for producing an antireflective coating. These compositions can be used in particular for coating safety glass.

The antireflective layers described in the unexamined published patent application DE 10 2004 027842 A1 contain a high proportion of $MgF_2$. A particular disadvantage in this case is the cost of $MgF_2$. Moreover, if the coated substrates are not disposed of properly, environmentally hazardous and toxic hydrofluoric acid (HF) can form.

A multilayer antireflective coating is disclosed in DE 10 2006 001078 A1, wherein the coating comprises a dense layer and a porous layer. The dense layer generally comprises fluorides, therefore this coating has the disadvantages set out above. Said document describes that the porous layer can be applied using "bar coating methods". However, no specific embodiment examples of this are provided in the document. No polymers are used to produce the compositions.

The unexamined published patent application WO 03/027034 A2 describes antireflective coatings having particularly high mechanical stability. This property is achieved by using $SiO_2$ particles with a specific particle size distribution.

In addition, the documents DE 100 51 724 A1 and EP 0 130 801 A1 disclose coating solutions for the production of antireflective layers. Furthermore, the publication DE 100 51 725 A1 discloses compositions for the production of antireflective layers that contain a high proportion of surfactants.

Screen printable $SiO_2$ sols which are suitable for the production of antireflective coatings are disclosed, for example, in WO 2008/14523 A1.

The documents cited above teach that the use of organic solvents is necessary, and no embodiment can be found, at least in the examples, in which high proportions of these solvents are not used.

It is a disadvantage of this teaching that the high proportion of organic solvents necessitates a large number of safety measures, so that processing the coating compositions is costly. For instance, depending on the nature and the proportion of the organic solvent used, the compositions are combustible. Particularly problematic are solvent vapors, which can be flammable or explosive. The organic solvent may also lead to odor pollution, necessitating filter systems. Furthermore, the solvents are recycled or reused to a certain extent. This procedure is likewise associated with costs.

Coating compositions that can be obtained without the use of organic solvents are described, inter alia, in the documents DE 40 20 316 A1, DE 196 49 953 A1 and EP 0 675 128 A1. However these coating compositions are not suitable for the production of antireflective coatings. Moreover, relatively expensive water-miscible silicon compounds are required for these compositions.

In view of the prior art, the object of the present invention is to provide a method for the production of an aqueous composition comprising a condensate based on silicon compounds, with which compositions that can be used to produce antireflective coatings on substrates, in particular inorganic substrates, can be obtained particularly easily and cost-effectively. In particular, it should be possible to carry out the method for coating substrates without costly safety measures, with a non-flammable composition being used wherever possible. A further object is to provide compositions for producing antireflective layers which can be converted into coatings that have particularly good adhesive strength and mechanical stability. Furthermore, it should be possible to carry out the method for producing the composition without costly aftertreatment and purification of the resulting reaction mixture.

These and other objects, which are not explicitly stated but can be readily derived or deduced from the contexts discussed in the introductory part hereof, are attained by a method having all the features of claim 1. Useful modifications of the method according to the invention are protected in subclaims 2 to 9. With regard to the composition, the subject matter of claim 10 provides a solution for attaining the stated object.

The subject matter of the present invention is a method for the production of an aqueous composition containing a condensate based on silicon compounds, said method comprising the following steps:

i) introducing at least one polymeric rheology control agent into water;
ii) adding at least one acidic catalyst;
iii) adding at least one silicon compounds of general formula (I)

$$R_nSiX_{4-n} \qquad (I),$$

in which the residues X are the same or different and stand for hydrolyzable groups or hydroxyl groups, the residues R are the same or different and stand for non-hydrolyzable groups or hydroxyl groups, and n is 0, 1, 2 or 3; and iv) converting at least a portion of the silicon compounds of general formula (I) that were added in step iii) in a hydrolysis reaction.

Surprisingly, a composition can thereby be obtained in a particularly simple and efficient manner, which can be used for the production of antireflective coatings. This composition can be applied to a substrate substantially without costly safety measures. Moreover, costly fire prevention measures can be dispensed with when using the composition. Furthermore, the method for producing the composition can be carried out without costly purification or aftertreatment of the reaction mixture.

The coatings that can be obtained using the compositions according to the invention exhibit high mechanical stability and high adhesive strength on many substrates.

Moreover, the compositions according to the invention can be produced and processed cost-effectively and in an environmentally safe manner. At the same time, the coated substrates exhibit surprisingly high transparency.

In step i) of the method according to the invention, at least one polymeric rheology control agent is introduced into water. Rheology control agents in the context of the present invention are compounds that strongly influence the viscosity of the composition. By using rheology control agents, the formation of large, highly condensed flocculated silicic acids can surprisingly be prevented. Preferred rheology control agents can be completely incinerated at temperatures above approx. 500° C.

The molecular weight of the rheology control agent is preferably within the range of 50000 g/mol to 20000000 g/mol, especially preferably within the range of 100000 g/mol to 2000000 g/mol and particularly preferably 200000 g/mol to 1000000 g/mol. The molecular weight in this case refers to the weight average and can be determined, for example, by gel permeation chromatography (GPC).

Preferred rheology control agents comprise hydroxy groups. According to a particular aspect, in particular cellulose, cellulose derivatives and particularly preferably cellulose ether and/or cellulose ester can be used as the rheology control agent. These include particularly hydroxypropyl methylcelluloses.

Polyacrylic acids, polyvinyl alcohols and polyacrylamides may also be used as preferred rheology control agents, with the above-stated celluloses and/or cellulose derivatives being preferred over the polyacrylamides.

The quantity of rheology control agent is preferably within the range of 0.1 wt/% to 40 wt/%, especially preferably within the range of 0.5 wt/% to 15 wt/% and particularly preferably 1 wt/% to 5 wt/% based on the weight of the mixture obtained in step i).

The water used in step i) is not subject to any specific restrictions, although the purity of the water should not present an obstacle to the subsequent use of the obtained composition. The mixture obtained in step i) preferably comprises 70 wt/% to 99.9 wt/%, especially preferably 85 wt/% to 99.5 wt/% and particularly preferably 95 wt/% to 99 wt/% water based on the weight of the mixture obtained in step i).

The polymeric rheology control agent can be introduced into the water in any routine manner. For example, the rheology control agent can be added as a solid substance or as an aqueous solution to water. Water may also be added to the rheology control agent. The resulting mixture can then be mixed by mechanical action, for example. The temperature of this mixing step can be within the range of 0° C. to 100° C. for example, preferably 10 to 60° C., without a limitation being intended as a result.

According to the invention, in step ii) an acidic catalyst is added. This catalyst can preferably be added to the mixture obtained in step i). The acidic catalyst may also be added to the water used in step i) and/or to the rheology control agent used in step i).

Acidic catalysts are widely known in the professional world, and organic and/or inorganic acids may be used, for example. Preferred acids include acetic acid, oxalic acid hydrochloric acid (HCl), sulfuric acid ($H_2SO_4$), phosphoric acid ($H_3PO_4$) and/or nitric acid ($HNO_3$).

The quantity of acidic catalyst is dependent on the nature of the catalyst and the desired reaction rate of the hydrolysis reaction to be performed in step iv).

Surprising advantages can be with quantities of acidic catalyst within the range preferably of 0.01 to 5 wt/%, preferably 0.05 to 4 wt/%, especially preferably 0.1 to 3 wt/% and particularly preferably 0.2 to 1 wt/%, based on the mixture obtained in step ii).

The mixture obtained in step ii) preferably comprises 70 wt/% to 99.89 wt/%, especially preferably 80 wt/% to 99.45 wt/% and particularly preferably 95 wt/% to 99 wt/% water.

The quantity of rehology control agent is preferably within the range of 0.1 wt/% to 40 wt/%, especially preferably within the range of 0.5 wt/% to 15 wt/% and particularly preferably 1 wt/% to 5 wt/% based on the weight of the mixture obtained in step ii).

In step iii) of the present method, a silicon compounds of the general formula $$R_nSiX_{4-n} \qquad (I),$$

in which the residues X are the same or different and stand for hydrolyzable groups or hydroxyl groups, the residues R are the same or different and stand for non-hydrolyzable groups and n is 0, 1, 2 or 3, is added.

Here, the silicon compounds of general formula (I) can be added to the mixture obtained in step i) and/or step ii) and/or to one of the educts used, for example the water that is used, the rehology control agent and/or the acidic catalyst. Surprising advantages can be achieved by addition to the mixture obtained in step i) or step ii), with addition to the mixture obtained in step ii) being particularly preferred.

In the silicon compounds of formula I, the hydrolyzable groups X are hydrogen or halogen, for example, preferably F, Cl, Br or I; alkoxy, preferably $C_{1-6}$ alkoxy, e.g. methoxy, ethoxy, n-propoxy, i-propoxy and butoxy; aryloxy, preferably $C_{6-10}$ aryloxy, e.g. phenoxy; acyloxy; preferably $C_{1-6}$ acyloxy, e.g. acetoxy or propionyloxy; alkylcarbonyl, preferably $C_{2-7}$ alkylcarbonyl, e.g. acetyl; amino, monoalkylamino or dialkylamino with preferably 1 to 12, particularly 1 to 6 carbon atoms.

In formula I, R stand for a non-hydrolyzable organic residue, which may optionally have a functional group. Examples of R are alkyl, preferably $C_{1-6}$ alkyl, such as methyl, ethyl, n-propyl, isopropyl, n-butyl, s-butyl and t-butyl, pentyl, hexyl or cyclohexyl; alkenyl, preferably $C_{2-6}$ alkenyl, e.g. vinyl, 1-propenyl, 2-propenyl and butenyl; alkynyl, preferably $C_{2-6}$ alkynyl, e.g. acetylenyl and propargyl; and aryl, preferably $C_{6-10}$ aryl, e.g. phenyl and naphthyl.

Specific examples of functional groups of the residue R are the epoxy, hydroxy, ether, amino, monoalkylamino, dialkylamino, amide, carboxy, mercapto, thio ether, vinyl, acryloxy, methacryloxy, cyano, halogen, aldehyde, alkylcarbonyl, sulfonic acid and phosphoric acid groups. These functional groups are bound to the silicon atom via alkylene, alkenylene or arylene bridge groups, which can be interrupted by oxygen or sulfur atoms or NH groups. The stated bridge groups are derived, e.g. from the aforementioned alkyl, alkenyl or aryl residues. The residues R preferably contain 1 to 18, particularly 1 to 8 carbon atoms. The stated residues R and X may optionally contain one or more routine substituents, e.g. halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxy, formyl, carboxy, mercapto, cyano, isocyanato, nitro, epoxy, $SO_3H$ or $PO_4H_2$.

The silicon compounds of general formula I can be hydrolyzed and condensed via the residues X. With these hydrolytically condensable groups, an inorganic network with Si—O—Si units is constructed. The residues R are hydrolytically stable under routine condensation conditions, in contrast to the residues X.

In a preferred embodiment; silicon compounds of the general formula $SiX_4$ in which the residues X are the same or different and stand for hydrolyzable groups or hydroxyl groups, are used to produce the condensate. Without limiting the general teaching, specific examples of such silicon compounds include $SiCl_4$, $HSiCl_3$, $Si(OCH_3)_4$, $Si(OOCCH_3)_4$, $Si(OC_2H_5)_4$ and $Si(OC_3H_7)_4$, with tetraalkoxysilanes, for example $Si(OCH_3)_4$ (TMOS), $Si(OCH_2CH_3)_4$ (TEOS) or $Si(OC_3H_7)_4$, being particularly preferred. The stated compounds can be used individually or as a mixture. The proportion of silicon compounds of the general formula $SiX_4$ is preferably within the range of 0 wt/% to 100 wt/%, especially preferably within the range of 40 wt/% to 100 wt/% and particularly preferably 80 to 100 wt/% based on the total quantity of monomeric silicon compounds. According to a particularly preferred variant of the present invention, essentially only compounds of the general formula $SiX_4$ are used as silicon compounds in step iii). By using high proportions of silicon compounds of the general formula $SiX_4$ the baking times are kept relatively short. Moreover, using high proportions of silicon compounds of the general formula $SiX_4$ enables highly adhesive coatings of excellent optical quality to be obtained on substrates in a particularly simple and cost-effective manner.

According to a further aspect of the present invention, a mixture of silanes is preferably used to produce the condensate, said mixture comprising at least one silicon compound of the formula $RSiX_3$, in which the residues X are the same or different and stand for hydrolyzable groups or hydroxyl groups and in which the residue R stands for a non-hydrolyzable groups. Without limiting the general teaching, specific examples of such silicon compounds include $Cl_3SiCH_3$, $Si(CH_3)(OC_2H_5)_3$, $Cl_3Si(C_2H_5)$, $Si(C_2H_5)(OC_2H_5)_3$, $Si(OC_2H_5)_3(CH_2—CH=CH_2)$, $Si(OOCCH_3)_3(CH_2—CH=CH_2)$, $Cl_3Si(CH=CH_2)$, $Si(CH=CH_2)(OC_2H_5)_3$, $Si(CH=CH_2)(OC_2H_4OCH_3)_3$ and $Si(CH=CH_2)(OOCCH_3)_3$. The stated compounds can be used individually or as a mixture. The proportion of silicon compounds of the general formula $RSiX_3$ is preferably no more than 80 wt/%, especially preferably no more than 10 wt/% based on the total quantity of monomeric silicon compounds.

In addition, the condensate can be obtained by condensation of a mixture comprising at least one silicon compound of the formula $R_2SiX_2$, in which the residues X are the same or different and stand for hydrolyzable groups or hydroxyl groups and the residues R are the same or different and stand for non-hydrolyzable groups. Without limiting the general teaching, specific examples of such silicon compounds include $Cl_2Si(CH_3)_2$, $Si(CH_3)_2(OC_2H_5)_2$, $Si(C_2H_5)2$, $Cl_2Si(CH=CH_2)(CH_3)$, $Si(CH_3)_2(OCH_3)_2$, $Cl_2Si(C_6H_5)_2$, and $Si(C_6H_5)_2(OC_2H_5)_2$. The stated compounds can be used individually or as a mixture. The proportion of silicon compounds of the general formula $R_2SiX_2$ is preferably no more than 20 wt/%, especially preferably no more than 10 wt/% based on the total quantity of monomeric silicon compounds.

Furthermore, the condensate can be obtained by condensation of a mixture comprising at least one silicon compound of the formula $R_3SiX$, in which the residue X stands for a hydrolyzable group or a hydroxyl group and the residues R are the same or different and stand for non-hydrolyzable groups. Without limiting the general teaching, specific examples of such silicon compounds include $(C_6H_5)_3SiOH$, $Si(CH_3)_3(OC_2H_5)$ and $Si(CH_2CH_3)_3(OC_2H_5)$. The stated compounds can be used individually or as a mixture.

The proportion of silicon compounds of the general formula $R_3SiX$ is preferably no more than 20 wt/%, especially preferably no more than 10 wt/% based on the total quantity of monomeric silicon compounds.

Silanes of general formula (I) can either be purchased or produced by methods as described in "Chemie and Technologie der Silicone" (W. Noll, Verlag Chemie, Weinheim/Bergstraße, 1968). They can be used either as such or in a precondensed form.

The quantity of silicon compounds of general formula (I) can preferably within the range of 0.1 wt/% to 40 wt/%, especially preferably within the range of 0.5 wt/% to 15 wt/% and particularly preferably 1 wt/% to 5 wt/%, based on the mixture obtained in step iii).

It can further be provided that seed particles are used for production of the condensate. Preferred seed particles can have an average particle diameter within the range of 1 to 100 nm, preferably within the range of 3 to 80 nm, particularly preferably within the range of 5 to 50 nm. Here, the average particle diameter refers to the numerical average and can be determined by microscopic methods, for example. The seed particles preferably comprise $SiO_2$, wherein the percentage by weight of $SiO_2$ is preferably at least 50 wt/%, especially preferably at least 80 wt/%, based on the total weight of the seed particles.

The proportion of the seed particles can particularly be within the range of 0.01 to 20 wt/%, preferably within the range of 0.1 to 10 wt/%, especially preferably within the range of 0.5 to 5 wt/%, based on the weight of silicon compounds of general formula (I).

Surprising advantages can be with quantities of acidic catalyst within the range preferably of 0.01 to 5 wt/%, particularly 0.05 to 3 wt/%, especially preferably 0.1 to 2 wt/% and particularly preferably 0.2 to 1 wt/%, based on the mixture obtained in step iii).

The mixture obtained in step iii) preferably comprises 70 wt/% to 99.79 wt/%, especially preferably 80 wt/% to 99 wt/% and particularly preferably 95 wt/% to 99 wt/% water.

The quantity of rheology control agent is preferably within the range of 0.1 wt/% to 40 wt/%, especially preferably within the range of 0.5 wt/% to 15 wt/% and particularly preferably 1 wt/% to 5 wt/%, based on the weight of the mixture obtained in step iii).

In step iv), at least a portion of the silicon compound of general formula (I) that is added in step iii) is subjected to a hydrolysis reaction. This results in an inorganic network, therefore the reaction can also be characterized as polycondensation by which a condensate is obtained. The proportion of the silicon that is converted in step iv) in relation to the quantity added in step iii) is based on the degree of conversion. Depending on the reaction process and the particle size, usually at least 40%, preferably at least 80%, especially preferably at least 95% of the silicon compounds added in step iii) are converted, and therefore the proportion of monomeric silicon compounds of formula (I) after hydrolysis step iv) is no more than 60%, preferably no more than 20%, especially preferably no more than 5% based on the weight of the silicon compounds originally added in step iii).

The hydrolysis is preferably carried out at temperatures of between 0 and 130° C., preferably between 15 and 40° C., and an overpressure may be applied to perform the reaction at high temperatures.

The duration of the hydrolysis reaction is dependent on the reactivity of the silicon compound used, the pH value and the reaction temperature. In general, the reaction duration can be selected so as to obtain a condensate which is present in the composition in a colloidally dispersed form.

The nature of the condensate to be obtained is known from the prior art described in the introductory part hereof, however these documents contain the differences presented above, in particular the use of large quantities of solvents. Additional references in this regard may be found in the documents DE 27 58 414, DE 27 58 415, DE 30 11 761, DE 38 26 715 and DE 38 35 968.

It can further be provided that steps i), ii), iii) and iv) are performed in the sequence i), ii), iii) and iv)

The proportion of $SiO_2$ condensate in the composition obtainable according to the invention is preferably within the range of 0.01 wt/% to 10 wt/%, especially preferably within the range of 0.1 wt/% to 5 wt/%. This proportion is based on the weight of the $SiO_2$ condensate after hydrolysis, without organic constituents. This concentration is particularly easily obtained from the weight of a layer produced by means of a baking process, in relation to the weight prior to baking.

The layer thickness of the antireflection coating can be adjusted, for example, by adjusting the proportion of $SiO_2$ condensate in the composition.

Surprisingly, the volume of water used for production of the coating composition can be selected so as to minimize the amount of excess water that must be separated out. Preferably no more than 20 wt/%, especially preferably no more than 5 wt/% water must be separated out of the composition after hydrolysis. According to a particularly preferred embodiment, no water is separated out after hydrolysis. Furthermore, the quantities of released alcohol or other organic compounds originating from the silicon compounds as a result of the hydrolysis are so small that they do not have to be separated out.

According to a particular aspect of the present invention, the condensate can be present in the composition in a colloidally dispersed form, with the condensate being present in the composition in particle form.

It can further be provided that particles, preferably silica sols, are added to the condensate. The properties of the condensate can thereby be adjusted to meet specific requirements. Preferred particles, in particular silica sols, can have an average particle diameter within the range of 1 to 100 nm, preferably within the range of 3 to 80 nm, especially preferably within the range of 5 to 50 nm. The average particle diameter refers here to the numerical average, and can be determined by microscopic methods, for example. The particles preferably comprise $SiO_2$, wherein the percentage by weight of $SiO_2$ is preferably at least 50 wt/%, especially preferably at least 80 wt/%, based on the total weight of the particles.

The proportion of particles added after step iv) can preferably be within the range of 0.01 to 20 wt/%, preferably within the range of 0.1 to 10 wt/%, especially preferably within the range of 0.25 to 5 wt/%, based on the weight of the composition obtainable according to the invention.

According to a preferred embodiment, the hydrolysis reaction according to step iv) is performed without the presence of significant proportions of additives, especially surface active substances. To improve the properties of the antireflective layer, an additive, preferably a surface active substance, may be added to the composition that is obtained after the hydrolysis reaction according to step iv). Preferred surface active substances include non-ionic surfactants, anionic surfactants and cationic surfactants. Of these, phosphoric acid ester surfactants and silicone surfactants, preferably polyether modified siloxanes, inter alia, are preferred. The HLB value of preferred surface active substances is within the range of 11 to 19, especially preferably within the range of 12 to 18, determined according to Davies.

The proportion of surface active substances in the composition that is obtainable according to the invention is preferably within the range of 0.005 wt/% to 2 wt/%, especially preferably within the range of 0.05 wt/% to 0.5 wt/%, based on the total weight of the composition after addition of the surface active substance.

The composition described above which is obtainable by the method according to the invention is a further subject matter of the present invention. The composition is characterized in particular by a low proportion of low molecular weight organic compounds, which preferably is no more than 10 wt/%, especially preferably no more than 5 wt/% and particularly preferably no more than 4 wt/%. Low molecular weight organic compounds preferably have a molecular weight of no more than 400 g/mol, preferably no more than 200 g/mol and especially preferably no more than 80 g/mol.

To produce an antireflective coating, the composition obtainable according to the method is applied to a suitable substrate. Routine coating methods may be used for this coating process, e.g. dip coating, flow coating, draw coating, cast coating, spin coating, spray coating, brush coating, screen printing or roller coating. Draw coating methods, flow coating methods and cast coating methods, particularly curtain coating, are especially preferred.

Prior to development of the antireflective properties, the applied composition can preferably be dried (at room temperature or at a slightly elevated temperature). Preferred layer thicknesses (in the wet state) are 10 to 50 μm, in particular 15 to 25 μm.

Once the composition has been applied, the organic constituents, for example the rheology control agent and the residues R, optionally present in the polycondensate, can be removed by heating. The temperatures applied in this process are of course based on the thermal stability of the coated substrates and of the organic constituents to be removed. The result is a purely inorganic antireflective coating with high thermal stability. The heating is preferably carried out at temperatures within the range of 500° C. to 1000° C., especially preferably within the range of 550 to 700° C. The baking can be carried out in routine sheet glass baking furnaces or hardening furnaces.

The composition according to the invention can be applied to mineral glasses in order to reduce reflection. The antireflective coating according to the invention can be used, e.g. to reduce reflection and to increase the transmission of cathode ray tubes, instrument displays, eyeglass lenses, screens, solar collectors, windows, etc.

Preferred substrates provided with an antireflective coating can have a transmission, for example, of at least 95%, preferably at least 96%. The coating may be applied to either one side or both sides, with application on both sides in many cases resulting in particularly high transmission or low reflection.

In the following, the present invention will be specified in greater detail with the aid of examples, without a limitation of the invention being intended as a result.

EXAMPLE 1

Production of a coating composition comprising a polycondensate from tetraethoxysilane (TEOS).

1.25 g hydroxypropyl cellulose (Nisso M, available from Nisso Chemical Europe GmbH, viscosity of an aqueous solution with 2 wt/% Nisso M is approximately 150 to 400 mPa*s, measured at 20° C., molecular weight is approximately 620000 g/mol) was added to 46.766 g water and stirred for 30 minutes at 30° C. to obtain a clear solution, to which 0.25 g HNO$_3$ was added in a second step, 1.734 g tetraethoxysilane was stirred into the resulting mixture, and after 18 hours at 30° C. a clear composition was obtained, which was applied to a glass substrate. The coating composition had a viscosity of 1.5 Pa*s at a shear rate of 0.2 s-1. Following application, the coating was dried for 10 minutes at 120° C. and baked for 5 minutes at 600° C. The result was an antireflective coating giving a dark blue reflection with slight spotting.

EXAMPLE 2

Example 1 was essentially repeated, however 0.1 wt/% of a surface active substance (polyether modified siloxane Byk 348, available from Byk Chemicals Japan) was added after the hydrolysis step.

An antireflective coating giving a dark blue reflection was obtained, which had fewer optical defects than the layer of Example 1.

EXAMPLE 3

Example 1 was essentially repeated, however 0.1 wt/% of a surface active substance (Byk 348, available from Byk Chemicals Japan) was added prior to the hydrolysis step.

An antireflective coating giving a dark blue reflection was obtained, which had considerably more optical defects than the layer of Example 1, with clearly visible spots developing.

COMPARATIVE EXAMPLE 1

Three drops TEOS were added to 10 ml water, wherein the silicon compound could not be dispersed in the water by stirring. The addition of 2 drops HNO3 led to the formation of opaque white floccules, with no development of a useful composition being observed.

EXAMPLE 4

2.2 g hydroxypropyl cellulose (Klucel L, available from Hercules, molecular weight approximately 95000 g/mol) was added to 95.5 g water that contained 0.263 g 50% H$_2$SO$_4$, and this was stirred for 60 minutes at 30° C. to obtain a clear solution. 1.363 g tetraethoxysilane was stirred into the resulting mixture which was hydrolyzed for 60 minutes. 0.661 g Koestrosol 3550 was stirred into the resulting mixture. The resulting composition was applied to sheet glass by screen printing (mesh 100T), producing a smooth layer. Following application, the coating was baked at 690° C. The result was an antireflective layer giving a blue to violet reflection.

The invention claimed is:

1. A method for producing an aqueous composition comprising a condensate based on silicon compounds, comprising the following steps:
   i) introducing at least one polymeric rheology control agent into water;
   ii) adding at least one acidic catalyst;
   iii) adding at least one silicon compound of formula (I):

$$R_nSiX_{4-n} \qquad (I),$$

in which the residues X are the same or different and stand for hydrolyzable groups or hydroxyl groups, the residues R are the same or different and stand for non-hydrolyzable groups, and n is 0, 1, 2 or 3; and
   iv) performing a hydrolysis reaction of at least a portion of the silicon compounds of formula (I) added in step iii),
   wherein steps i), ii), iii) and iv) are carried out in the sequence i), ii), iii) and iv),
   wherein organic compounds having a molecular weight of no more than 400 g/mol are present in the composition at a proportion of no more than 10 wt % based on the total weight of the composition,
   wherein the composition is free of organic solvents,
   wherein the quantity of silicon compounds of the general formula (I) is in the range of 0.1 wt % to 5 wt % based on the mixture obtained in step (iii), and
   wherein the mixture obtained in step (iii) comprises 70 wt % to 99.79 wt % water and polymeric rheology control agent.

2. The method according to claim 1, characterized in that the rheology control agent has a molecular weight M$_w$ within the range of 1000 to 2000000 g/mol.

3. The method according to claim 1, characterized in that 0.1 wt % to 40 wt % rheology control agent based on the weight of the mixture obtained in step i) is used to produce the composition in step i).

4. The method according to claim 1, characterized in that the rheology control agent is a polyacrylamide, a cellulose or a cellulose derivative.

5. The method according to claim 1, characterized in that at least one silicon compound of the formula SiX$_4$ is used, in which the residues X are the same or different and stand for hydrolyzable groups or hydroxyl groups.

6. The method according to claim 1, characterized in that the proportion of the silicon compound according to the formula SiX$_4$ is within the range of 80 wt % to 100 wt %, based on the total quantity of silicon compounds of formula (I).

7. The method according to claim 1, characterized in that after step iv) has been performed, a surface active substance is added to the composition.

8. The method according to claim 1, characterized in that the at least one silicon compound of formula (I) is selected from the group consisting of SiCl$_4$, HSiCl$_3$, Si(OCH$_3$)$_4$, Si(OOCCH$_3$)$_4$, Si(OC$_2$H$_5$)$_4$ and Si(OC$_3$H$_7$)$_4$, tetraalkoxysilanes, Si(OCH$_3$)$_4$, Si(OC$_3$H$_7$)$_4$, and combinations thereof.

9. The method according to claim 1, characterized in that no more than 80 wt % of the at least one silicon compound of formula (I) comprises one selected from the group consisting of Cl$_3$SiCH$_3$, Si(CH$_3$)(OC$_2$H$_5$)$_3$, Cl$_3$Si(C$_2$H$_5$), Si(C$_2$H$_5$)(OC$_2$H$_5$)$_3$, Si(OC$_2$H$_5$)$_3$(CH$_2$—CH=CH$_2$), Si(OOCCH$_3$)$_3$(CH$_2$—CH=CH$_2$), Cl$_3$Si(CH=CH$_2$), Si(CH=CH$_2$)(OC$_2$H$_5$)$_3$, Si(CH=CH$_2$)(OC$_2$H$_4$OCH$_3$)$_3$, Si(CH=CH$_2$)(OOCCH$_3$)$_3$, and combinations thereof.

10. The method according to claim 9, characterized in that no more than 20 wt % of the at least one silicon compound of formula (I) comprises at least one selected from the group consisting of (C$_6$H$_5$)$_3$SiOH, Si(CH$_3$)$_3$(OC$_2$H$_5$), Si(CH$_2$CH$_3$)$_3$(OC$_2$H$_5$), and combinations thereof.

11. The method according to claim 1, characterized in that no more than 20 wt % of the at least one silicon compound of formula (I) comprises at least one selected from the group consisting of $Cl_2Si(CH_3)_2$, $Si(CH_3)_2(OC_2H_5)_2$, $Si(C_2H_5)_2(OC_2H_5)_2$, $Cl_2Si(CH=CH_2)(CH_3)$, $Si(CH_3)_2(OCH_3)_2$, $Cl_2Si(C_6H_5)_2$, $Si(C_6H_5)_2(OC_2H_5)_2$, and combinations thereof.

12. The method according to claim 1, wherein the step iv) is performed without the presence of a surface active substance.

* * * * *